Figure 4B:
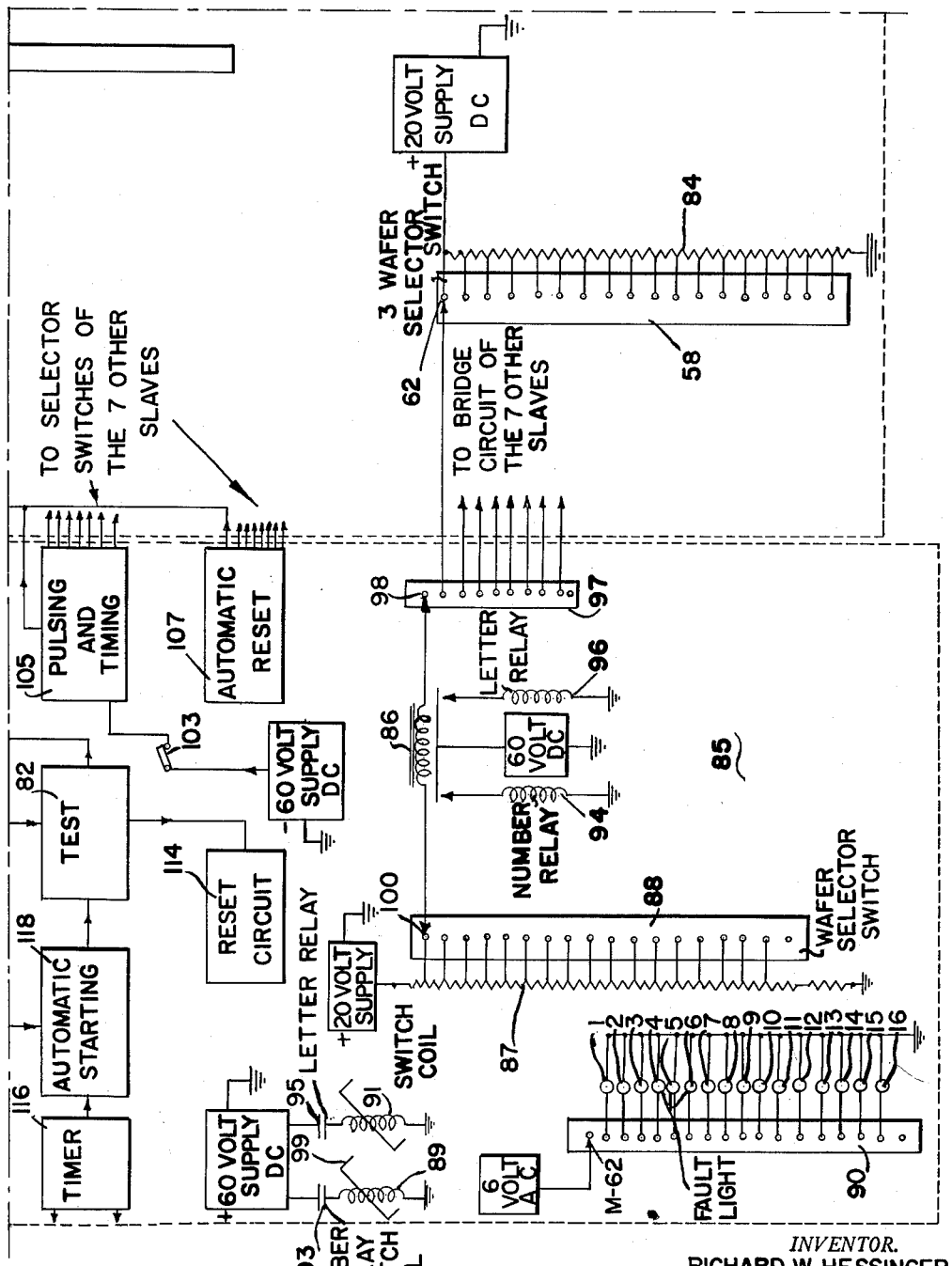

June 13, 1961 R. W. HESSINGER ET AL 2,988,694
AUTOMATIC FAULT LOCATOR
Filed Aug. 6. 1956 7 Sheets-Sheet 1
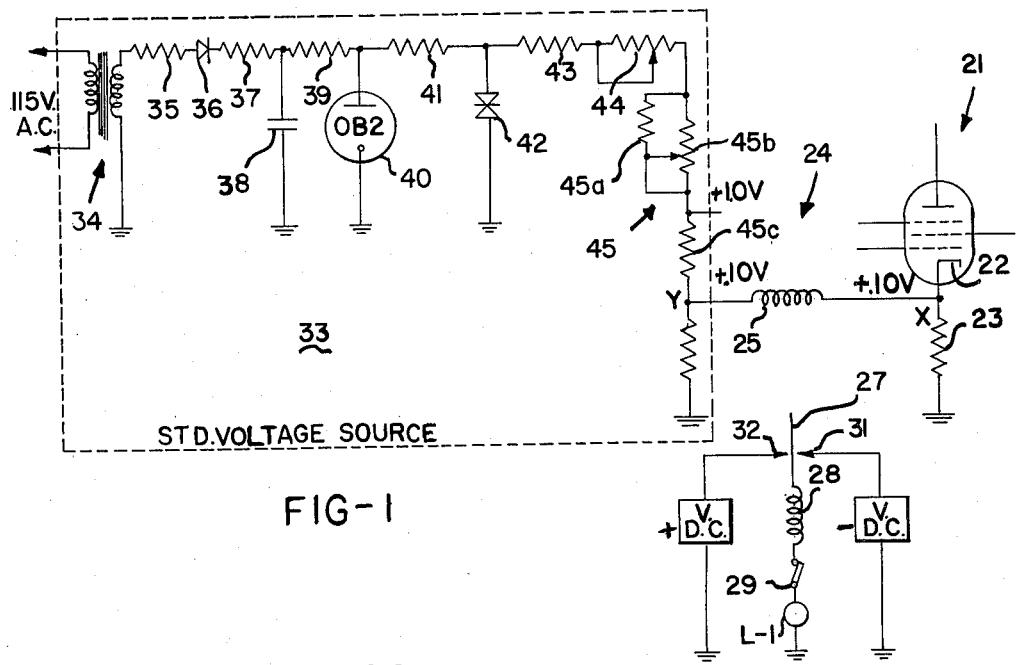
FIG-1
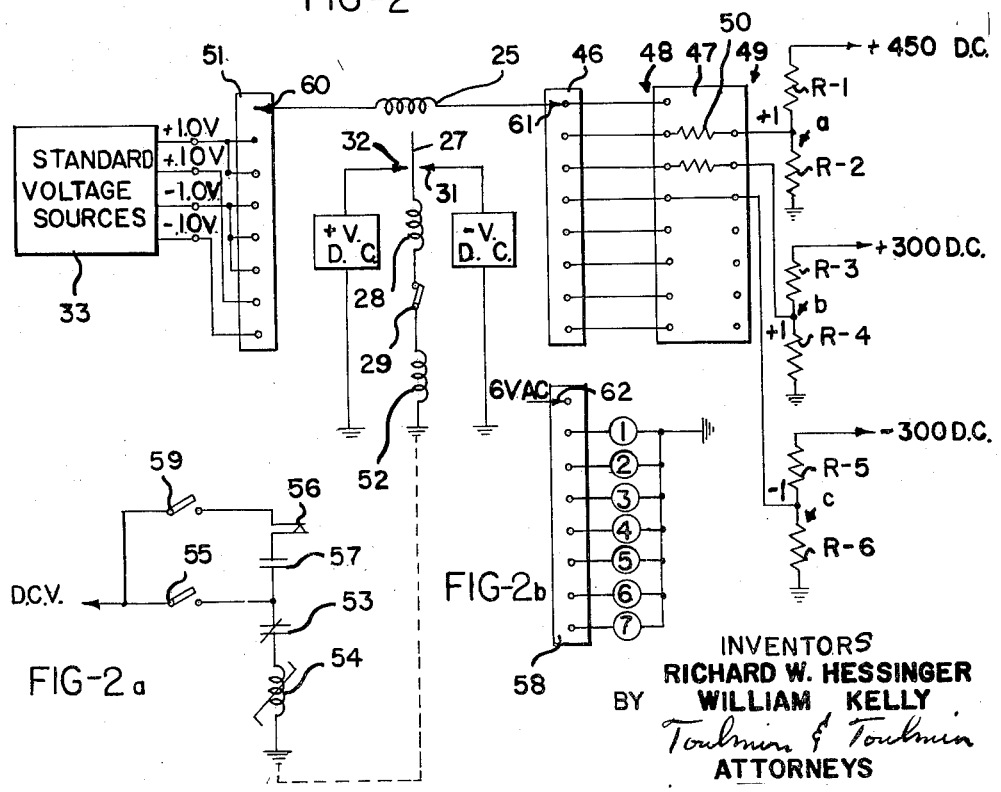
FIG-2
FIG-2a   FIG-2b
INVENTORS
RICHARD W. HESSINGER
WILLIAM KELLY
BY Toulmin & Toulmin
ATTORNEYS

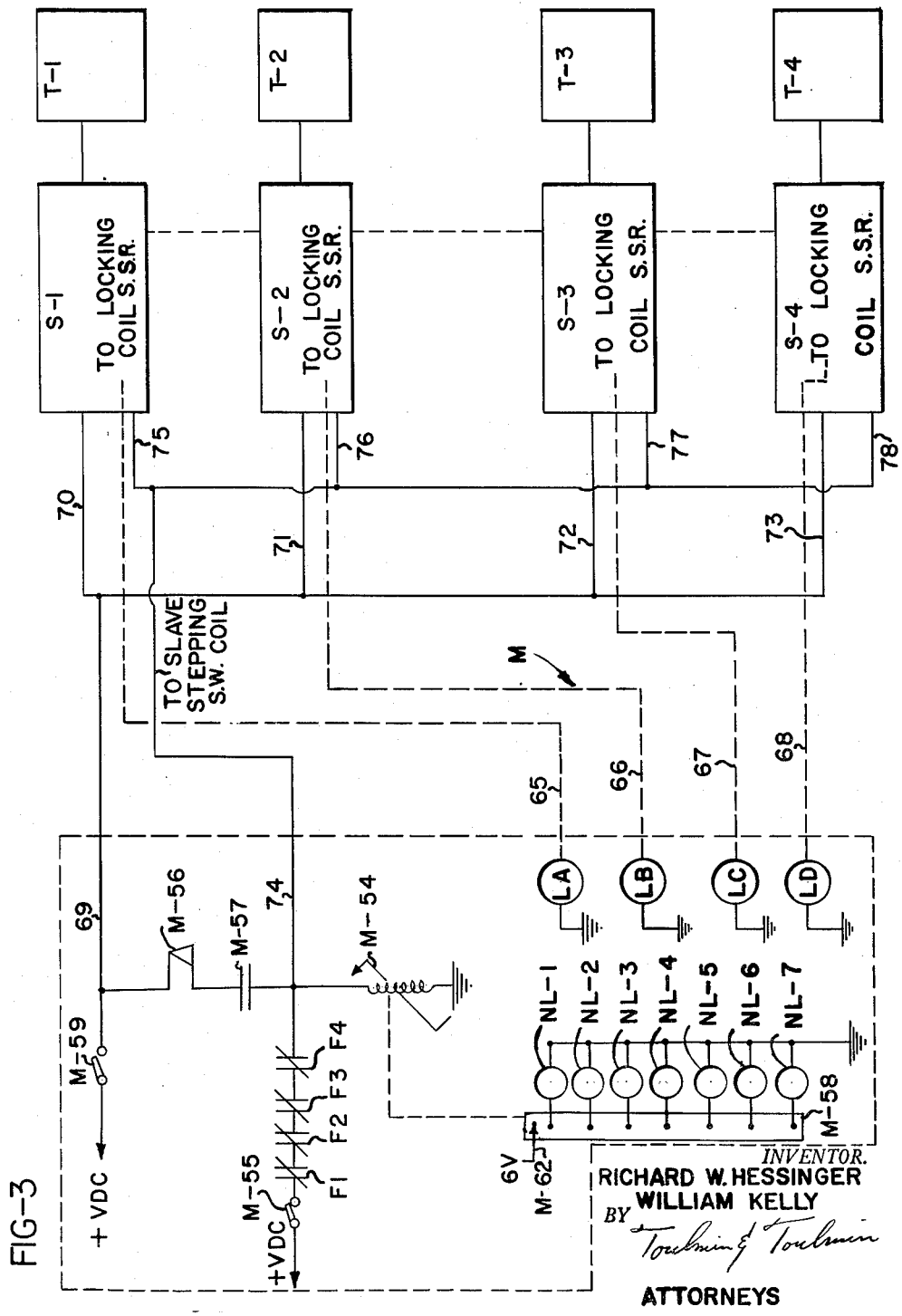

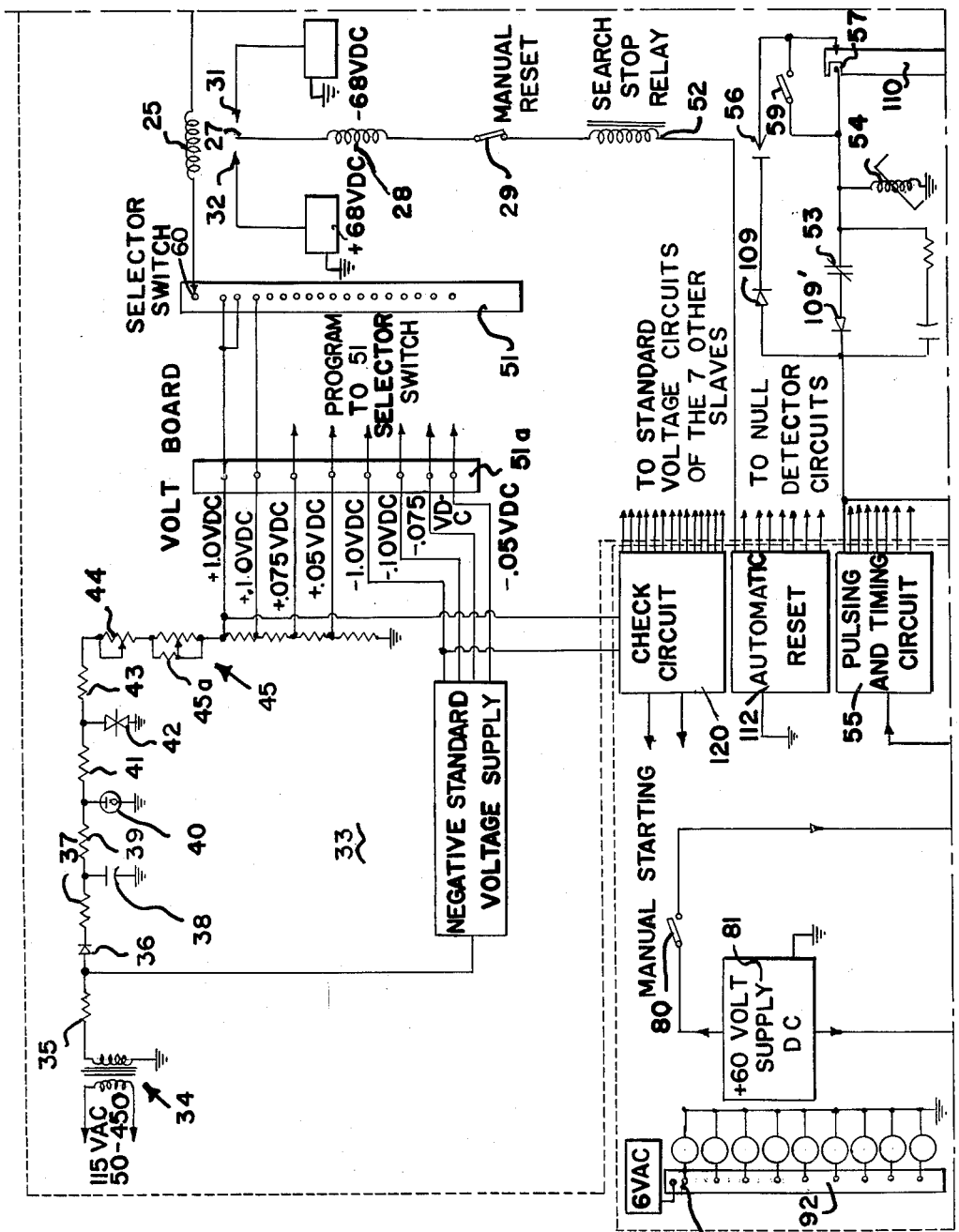

June 13, 1961  R. W. HESSINGER ET AL  2,988,694
AUTOMATIC FAULT LOCATOR
Filed Aug. 6, 1956  7 Sheets-Sheet 4

INVENTOR.
RICHARD W. HESSINGER
WILLIAM KELLY
BY
Toulmin & Toulmin
ATTORNEYS

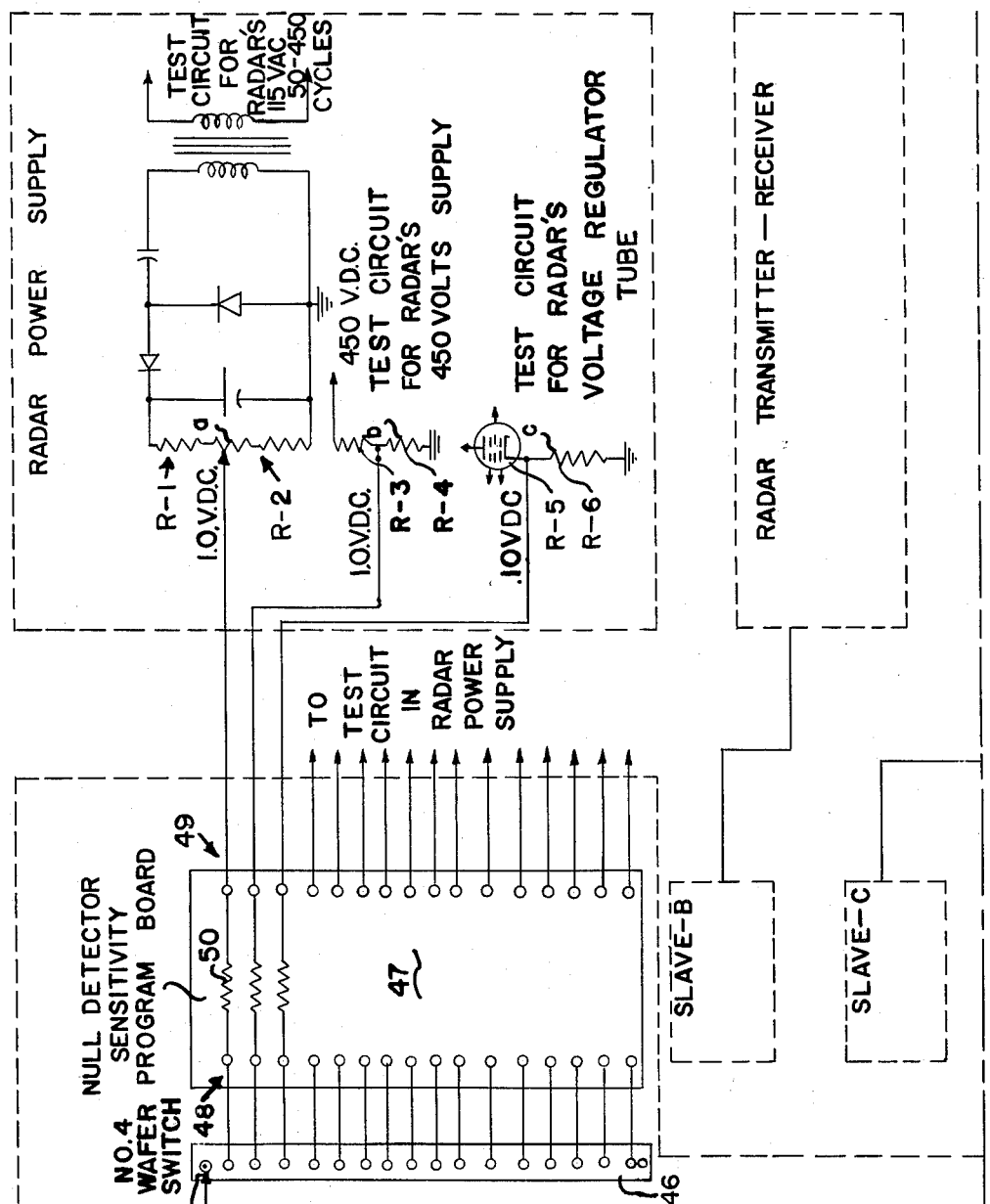

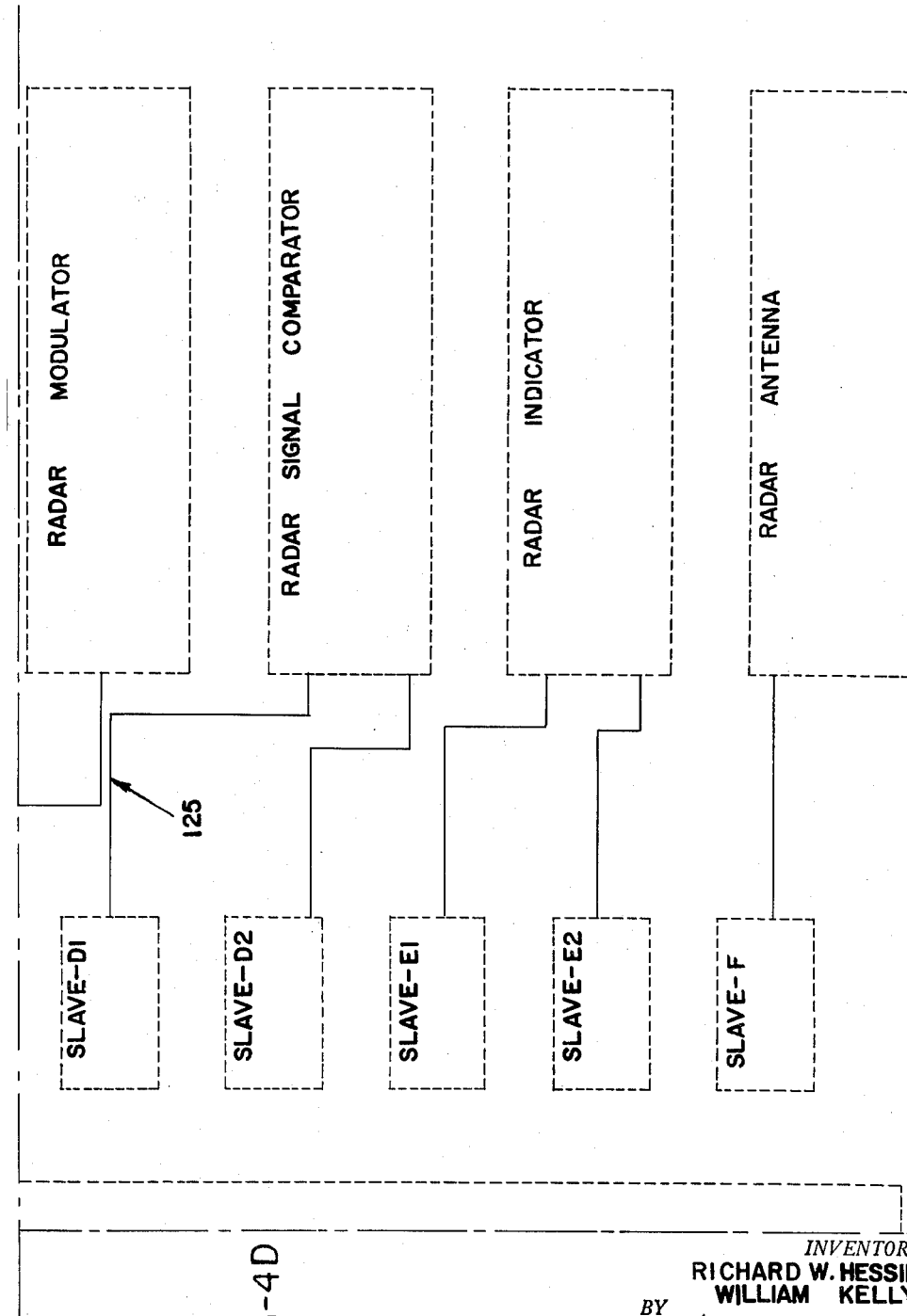

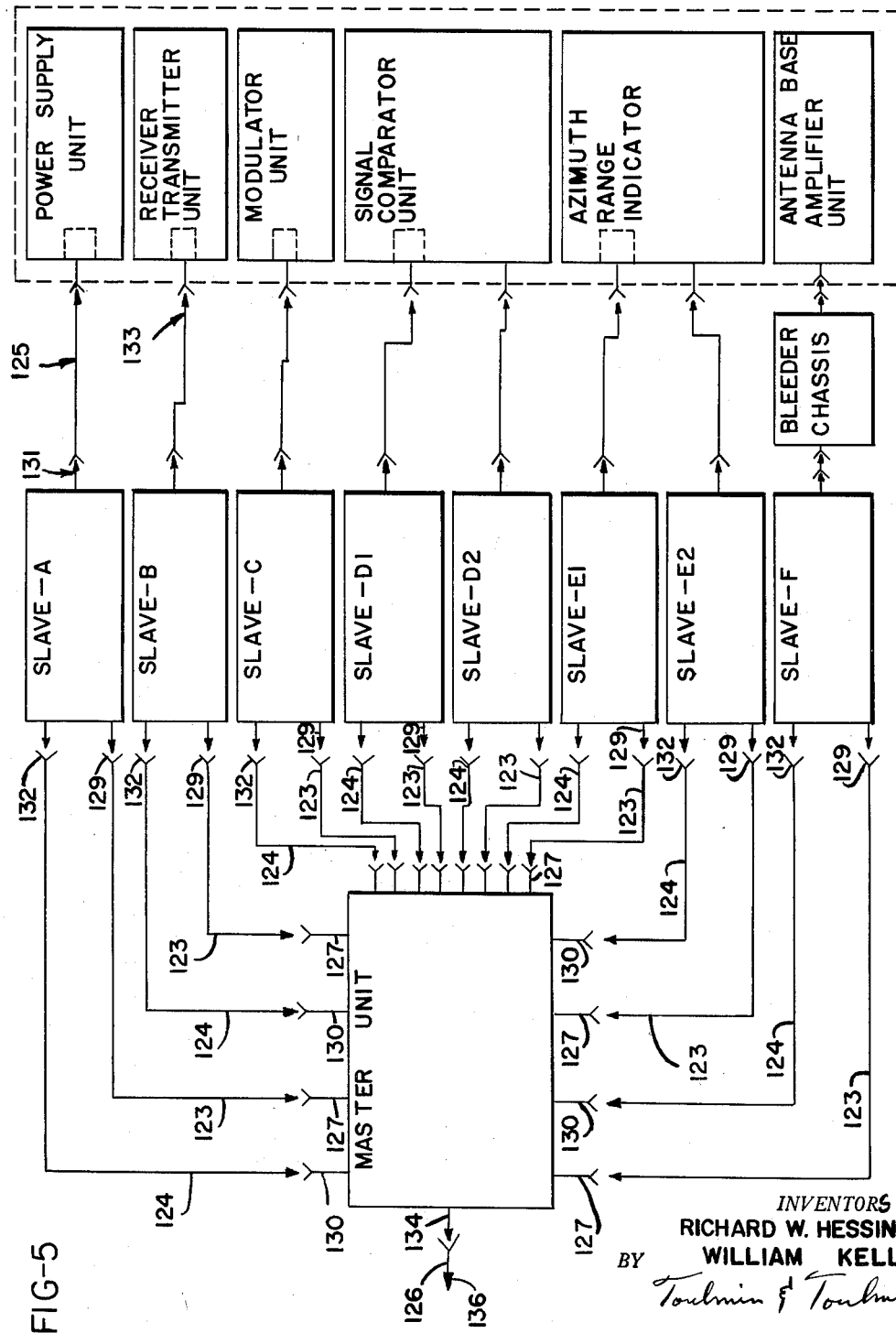

United States Patent Office 2,988,694
Patented June 13, 1961

2,988,694
AUTOMATIC FAULT LOCATOR
Richard W. Hessinger and William Kelly, Dayton, Ohio, assignors to The Commonwealth Engineering Company of Ohio, Dayton, Ohio, a corporation of Ohio
Filed Aug. 6, 1956, Ser. No. 602,350
6 Claims. (Cl. 324—73)

This invention relates to devices capable of detecting faults in electrical or electronic equipment. The invention is particularly directed to devices for the determination of the operating conditions of electrical apparatus quickly and accurately. Thus for example the apparatus of invention is capable of indicating the operating conditions of radar sets, sound transmission equipment, computers, automation circuits, strain gauge apparatus, receiving and transmitting equipment and similar electric and electronic mechanism.

A primary object of the invention is to provide an automatic electro-mechanical device which aids in the rapid isolation of circuit and circuit component breakdown and which device provides the necessary information for repair of the fault.

A principal object of the invention is the provision of ultra stable regulated power supplies which are effective to provide stabilized voltages for comparison with voltages at monitored points of the equipment to be checked; a particular feature of the specific stabilized power supply of invention is that vacuum tubes are not employed in the standard power supply.

Another object of the invention is the provision of apparatus which is capable of checking a very large number of monitored points within an apparatus in a very short period of time.

The apparatus of invention tests electronic or electrical apparatus when the latter is in its normal operating condition and without interfering with its normal operation. The testing provides information to an operator of the monitoring equipment as to the operating condition of the monitored equipment. Thus in effect the apparatus of invention provides information as to the internal nature of the monitored equipment at an external source. When trouble arises within the equipment preventive maintenance may be taken promptly to avoid accumulation of difficulties.

The preferred embodiment of the apparatus of invention comprises:
(a) Standard voltage reference sources;
(b) Null detectors, null detector circuits and components;
(c) Control circuits
(d) Fault indication circuits and components.

*The standard voltage reference*

With respect to the standard voltage reference source, it is preferred in the practice of the invention to employ an extremely well regulated current power supply involving the use, in combination, of a shunt gaseous tube regulator and a shunt semi-conductor regulator device. This standard ultra stable regulated power supply is utilized to effect a comparison with voltages at monitored points within the apparatus under examination. The magnitude of the standard voltage is limited in accordance with the invention by several factors including:

(1) The amount of the series resistance required in the monitored circuit across which a voltage equal to the standard voltage is developed. The standard voltage must be matched with a similar voltage from the measured circuit and normally a very large resistance would be required in series with a cathode, for example, and with other circuits under measurement if the standard voltage level is high; since such might of itself lead to malfunction of the device under test, in the practice of this invention the standard voltage is maintained low; and (2) The null detector current is a factor in the sensitivity of the null detector and is related to the value of the reference voltage.

*The null detector*

The null detector sensitivity determines the level of detectable changes in the apparatus and is practically related to the value of the reference voltage which affects the operating time. A voltage type meter, i.e. a milli-volt meter, is preferably employed and the needle of the meter should be mechanically short to cut down the inertia effect. The null detector circuits employ a highly sensitive meter relay to indicate when a potential difference exists between the standard voltage supply and the monitored voltage under test. A relay working in conjunction with the meter relay stops a stepping switch which controls the selection of the circuit of the meter to be tested on the position which is faulty.

*The control circuits*

The control circuits provide the necessary switching for the various null detection circuits and also provide for the resetting of the various stepping switches and meter relays to their home or neutral position.

*Fault indication circuits*

The fault indication circuits suitably incorporate a quantity of number and letter lights and a fault is indicated at a monitored point when a combination of a number and a letter light is energized simultaneously.

In general, in the operation of the device, the device is associated with an electronic circuit to be examined which circuit has at a point therein a specific voltage representing the normal or proper operating condition of the circuit. This voltage in most cases is permitted to vary between certain limits, for example, a plate voltage may vary from +297 volts D.C. to +303 volts D.C. In practice these operating voltages are divided down to provide the low voltages referred to hereinbefore. When these limits are exceeded, however, the circuit is considered faulty.

In the apparatus of invention the monitored voltage can be compared with a standard voltage of the same polarity and if the voltages are identical no current will pass in the circuit between them. However, if the monitored voltage differs from the standard voltage and these voltages are applied to a null indicator the latter will be affected by the unbalanced voltage. The minimum change in the unbalanced voltage to cause an indication on the null indicator is determined by the sensitivity of the meter and to some extent by the circuits used to develop the standard and monitored voltages. For this reason and since there are so many levels of voltages in electric and electronic circuits several standard low voltage levels of plus and minus polarity are established in accordance with the invention.

The automatic fault locator of this invention then operates on the principle of comparing two opposing D.C. voltages through a sensitive null indicator. Stepping switches provide an automatic method of connecting the null indicator to the various test points to be measured. In the description of the invention reference is made to stepping switches or selector switches which are commercially available, such as Ledex wafer type units, although other selector switches may be employed.

Features of the invention include a master unit which controls a plurality of slave units to determine the location of a fault, the master unit itself being provided with letter fault lights and number fault lights for visually indicating the presence of a fault.

Means are provided to step a Ledex selector switch in each slave at 3 or 4 steps per second, and means are also provided to assure that selector switches in different slave units do not step at the same time to minimize transients and power consumption.

The apparatus includes provision for stopping a selector switch in an individual slave unit on a voltage point within an allotted time. The control wires between slave units and master unit are kept at a minimum. Provision is made for the programming of each monitored point and each monitored point may be checked for any one of the following: voltage, wave form, current and frequency.

The invention will be more fully understood by reference to the following detailed description and accompanying drawings wherein:

FIGURE 1 is a schematic illustration of an apparatus for the detection of the operating condition of equipment at a single point;

FIGURE 2 schematically illustrates an apparatus arrangement utilizing one null detector for monitoring conditions at a plurality of monitored points;

FIGURE 2a illustrates apparatus in conjunction with the fault stopping relay of FIGURE 2;

FIGURE 2b schematically illustrates fault indication lights provided in conjunction with a wafer of a stepping switch associated with the stepping switch of FIGURE 2;

FIGURE 3 schematically illustrates the utilization of a plurality of null detector units for the detection of conditions of a large plurality of points in more than one unit under test;

FIGURES 4a, 4b, 4c and 4d schematically illustrate a complete operative structure of the fault locator of invention; and FIGURE 5 illustrates the complete operative structure in block diagram form.

In the drawings, for the sake of clarity, values have been provided on the electrical components to indicate a completely operative arrangement of the apparatus. Also the numerals from 1 to 16 have been utilized to designate points to be checked.

Referring now to FIGURE 1, the numeral 21 generally designates a tube, a circuit of which is under test. The cathode 22 of this tube is provided in the cathode lead thereof with resistor 23 of fixed predetermined value which provides an normal operating voltage at the point X. In the instance under consideration the resistor has been chosen to have a value of 46.06 ohms and the normal operating voltage at X is +0.10 v.

The numeral 24 generally designates a null indicator. The null indicator or meter relay includes a signal coil 25, needle 27, lock coil 28, contact points 31 and 32. The locking coil circuit is completed to ground through reset switch 29 and an indicating light L–1, there being only one number light since there is only one point to be monitored. The meter needle is movable between contact points schematically indicated at 31 and 32. Contact 31 is connected to ground through a negative D.C. voltage, while contact 32 is connected to ground through a positive D.C. voltage. These voltages may suitably have a value of about 6–8 volts to provide for energizing locking coil 28 and indicator light L–1.

One end of the signal coil 25 is directly connected to the point X which is to be monitored. The second side of the signal coil 25, shown leftwardly in FIGURE 1, is connected to a voltage source designated generally by the numeral 33. This standard voltage source is connected to line voltage through a transformer 34 which is preferably adapted for operation on an input power of 115 volts A.C. at 50 to 450 cycles. The standard voltage source includes current limiting resistor 35, rectifier 36, filter resistor 37, filter capacitor 38, filter resistor 39, a type OB2 gas filled cold cathode tube 40; filter resistor 41 is connected to tube 40 and to a semi-conductor diode 42 which is preferably an A6C siliconductor. This latter combination provides a cascaded circuit of high stability; the siliconductor is operated under conditions commonly identified as the Zener voltage region and will provide a constant D.C. voltage for a very large change in siliconductor current.

Dropping resistor 43 is connected to the potentiometer 44 which forms a portion of a voltage divider generally designated at 45 having values as shown; the divider 45 includes a resistor 45a which provides a linear adjustment for the setting of the voltage at point Y. The divider 45, as may be seen from the drawing, also includes precision resistors 45b, 45c, which provide constant positive voltages, in the instance of FIGURE 1, of values of 1.0 volt and .10 of a volt.

In the illustration set out in FIGURE 1, the coil 25 is connected to the point Y which has a constant voltage value of plus 0.10.

In the operation of the device of FIGURE 1, if the current through the tube 21 either increases or decreases then the voltage across the resistor 23 will either increase or decrease; when this voltage changes, current will pass either from or to the point X through the signal coil of the meter relay to or from the standard voltage source.

Current through the signal coil 25 of the meter relay causes the needle 27 to swing to make contact with the plus or minus D.C. locking voltage, thus energizing the locking coil 28 of the meter relay. This energizes the indicator light L–1 and will denote a fault at point X. The meter will remain locked until the reset switch 29 is operated manually to open the circuit.

It is to be noted that the sensitivity of the null detector is an important consideration in determining how much of a voltage variation may exist prior to actuation of the indicator light L–1. In the FIGURE 1 device visual inspection of the needle provides the necessary information as to whether the voltage at point X is high or low.

Referring to FIGURE 2 the same principles apply as set forth in connection with FIGURE 1 but the arrangement of FIGURE 2 is adapted to automatically detecting voltage at a plurality of points with only one null detector unit.

As shown in FIGURE 2 signal coil 25 is connected rightwardly to a wafer 46 through wiper 61 which wafer forms one wafer of a stepping switch having a plurality of contact points. The wafer 46 is directly connected to a terminal board 47 through a plurality of contacts generally indicated at 48 and carried on the left hand side of the terminal board as shown in FIGURE 2. The right hand side of the board carries a plurality of contacts generally indicated at 49, and these contacts are connected to points to be monitored, such as a, b, and c.

Resistors, as at 50, may connect opposed terminals of the board 47 as shown, the resistors being for the purpose of decreasing the sensitivity of the meter relay. The sensitivity of the relay is decreased by a predetermined amount by inserting calculated values of resistance to allow for different permitted voltage variations in the circuit under test. In this connection it is to be noted that the sensitivity of the meter relay is greatest when the least amount of resistance or a jumper wire is connected between the terminal points or lugs 48, 49 on terminal board 47.

The signal coil 25 (FIGURE 2) is connectible to the various contact points of a first wafer 51 through wiper 60 of a stepping switch which contact points derive their voltages from a standard voltage source, as clearly indicated in FIGURE 2 at 33, the source being the same as that shown in FIGURE 1.

The meter relay, as shown in FIGURE 2, includes a coil 52 which is a search stopping or fault stopping relay coil. When a fault occurs, such as has already been described in connection with FIGURE 1, and current flows through the locking coil 28, the current also flows through the search stopping relay coil 52, energizing this relay. This relay has normally closed contacts 53 (FIGURE 2a) which are in series with the coil 54 of the stepping switch.

Energization of the coil 52 opens the contacts 53 and prevents further pulsation of the stepping switch. This stepping switch coil normally controls the stepping of the contacts on wafers 46, 51 and 58, and accordingly de-energizing the coil 54 stops all stepping at the fault.

The pulsing switch 55 (FIGURE 2a) is in series with and controls the stepping switch coil and may be arranged to be operated by hand, by cam action with a motor, the pulsing switch, as shown in FIGURE 2a, being connected to a source of D.C. voltage. As shown in FIGURE 2a pulsing switch 55 is intended to be operated by hand.

A reset switch 59, interrupter contacts 56, and the open in home contacts 57 are provided in parallel with pulsing switch 55 and permit the stepping switch to be reset back to a home or first position. When a fault does occur it is necessary to operate the meter reset switch 29 to clear the circuit before the stepping switch can continue through the rest of its cycle.

As shown in FIGURE 2b, a third wafer of the stepping switch, designated by the numeral 58 and energized from an A.C. source of 6-volts, is provided with a plurality of contacts which are individually connected to indicator lights L-1 to L-7. When a fault does occur the appropriate light will be illuminated and will stay illuminated until the switch 29 is depressed and the selector switch steps off that position. It is therefore possible to tell that point in the circuit which is faulty. It is to be noted that at each position of stepping a light will be illuminated, but when a fault occurs it will not be possible to step from the light which indicates the fault.

Summarizing, stepping of the switch is such that the movable contacts indicated at 60, 61 and 62 move in unison and thus as contacts 60, 61 move downwardly in FIGURE 2 from the dead initial position to the contact positions for monitored points a light will be illuminated at each contact point; however, the light will be illuminated only momentarily as the contact 62 traverses unless a fault occurs, in which event a light will remain lit to indicate the fault until the reset switch 29 is operated and the selector switch steps off that position.

In the FIGURE 2 arrangement as shown points a, b and c may be tested as these are connectible through the terminal board with null indicator coil 25. The remaining contacts of the board as shown are not connected to points to be monitored. Accordingly, only lights L-1, L-2 and L-3 are connected to monitored points in the drawings, but others may be added as desired to be indicated by lights L-4 to L-7, inclusive. Suitable resistors designated R-1 to R-6, inclusive, are provided in order that appropriate standard voltages as shown may appear at the terminal board.

With the arrangement of FIGURES 2, 2a and 2b then the pulsing switch 55 controls the stepping switch coil but is itself in series with the search stopping relay contacts and the stepping switch cannot be stepped after a fault until the search stopping relay contacts are closed. Accordingly, after a fault, reset switch 29 is first actuated to clear the circuit and remake the contacts on the search stopping relay.

If it is desired to return to the home position reset switch 59 is actuated; this latter switch is in series with the interrupter contacts which are mechanically operated from the stepping switch coil to permit the device to home; contact 57 opens only in the home position, thus preventing further pulsing of the stepping switch coil 54. To step off home it is then necessary to actuate pulsing switch 55. It will be noted that with the arrangement of FIGURE 2 a single stepping switch permits checking of a plurality of points with a single null detector.

FIGURE 3 illustrates an arrangement when a plurality of null detector units are employed to monitor a very great number of apparatus points within a very short period of time.

As shown in FIGURE 3 the apparatus under test are indicated at T-1, T-2, T-3 and T-4. These each have a plurality of circuit points thereof connected to a single null detector as in FIGURE 2; thus T-1 is connected to null indicator or slave S-1; T-2 to S-2; T-3 to S-3 and T-4 to S-4.

The slaves are electrically connected to a control unit or master indicated by the enclosing dotted lines in FIGURE 3 and wherein components of the master have the prefix M.

The numerals 65, 66, 67, 68 designate electrical leads connecting the meter relay locking coil circuits with letter fault indication light L-A, L-B, L-C and L-D, one light for each of slaves S-1, S-2, S-3 and S-4.

The lead 69 through leads 70, 71, 72, 73 connects the slaves with the reset switch M-59 of the master which has interrupter contacts at M-56 and open in home or off normal contacts M-57.

The lead 74 connects the master with stepping switch coils in each slave through leads 75, 76, 77 and 78. The stepping switch coil of the master is designated by M-54.

The search stopping relay contacts of the slaves are designated at F-1, F-2, F-3 and F-4 in FIGURE 3 and are arranged in series with the pulsing switch M-55 of the master as shown.

Wafer M-58 has a movable contact M-62 connectible to a 6-volt source and to indicator number lights NL-1, NL-2, NL-3, NL-4, NL-5, NL-6 and NL-7 and is on the stepping switch having coil M-54 as indicated by the dotted line. Accordingly the number lights are stepped when coil M-54 is energized. As shown in FIGURE 3 wafer M-58 has 8 positions and 7 lights, the home position having no light.

Referring to the operation of the FIGURE 3 device first, it is to be noted that the stepping switch M-54 is pulsed every time the slave selector switches are pulsed. Thus, if a fault occurs at the fifth position, for example in S-1, then the search stopping relay contact F-1 opens and the coil M-54 is rendered inoperative.

Preferably the stepping switch coils of the slaves S-1, S-2, S-3, S-4 are so arranged that the first position of each slave is stepped off before the second position of any slave is checked, and all first positions are checked at the same time. Similarly succeeding positions designated by the same numerals are checked simultaneously for the slaves. Therefore if the first fault occurred when light L-A and NL-5 were energized, it would be known that the first four positions of each slave were clear and in operating condition.

To re-start the apparatus of FIGURE 3 after a fault occurs and to continue the stepping procedure is similar to that of FIGURE 2; the reset switch of the slave is actuated to clear the circuit and close the contacts of the search stopping relay, whereafter the pulsing switch actuates the apparatus through the remainder of the cycle or until another fault occurs. Essentially the FIGURE 3 arrangement is a composite in parallel of the apparatus of FIGURES 1 and 2.

Reference may now be had to FIGURE 4 wherein the master and a null indicator arrangement is set forth capable of permitting checking of 128 points in about 10 seconds with 8 slaves operating.

The arrangement of the components of FIGURE 4 differs somewhat in mode of operation from the devices of FIGURES 1-3, inclusive; in general the system is automatic, provides for pulsing through electric motor means, includes stagger switching for the slaves and incorporates a different method of presenting fault information to the indicating lights.

Corresponding parts in FIGURE 4 have been given the same reference characters as in the previous figures except that the slaves themselves and the letter lights identifying the slaves are numbered somewhat differently.

As shown in FIGURE 4 the apparatus of invention is connected to radar equipment for checking the same and legends identify the radar components appropriately. Except for the inclusion of a program board 51a to connect the positive and negative standard voltages to the wafer 51 the connections have already been described including the null indicator.

With reference to the means for indicating the faults visually there is included in the master a manual starting switch 80 which is operable to connect a 60-volt source of supply at 81 to a test cycling circuit 82 comprising holding and lockout circuits for the system which permit resetting of all null indicators and selectors to normal position, one for each slave.

The test cycling circuit energizes the pulsing and timing circuits at 55; one pulsing and timing circuit 55' serves the 8 slaves and consists of 9 cams spaced at 45° intervals to provide 8 positions and 18 revolutions per test cycle are effected by this arrangement. The first and last positions on each of the 8 slaves are not utilized for test purposes; therefore 128 positions are operative in the apparatus of FIGURE 4.

The pulsing timing circuit to slave A as shown is connected through the contacts 53 of the search stopping relay to the coil of the Ledex selector switch 54 (see FIGURES 2, 2a and 2b).

The action controlled by coil 54 provides for stepping of the wafer 51 at the standard voltage, the wafer 46 at the test points, the wafer 58 and wafer 110 of the Ledex selector switch. The wafer indicated by the numeral 58 has a plurality of positions connected to a dropping resistor 84 forming a part of a bridge circuit indicated generally at 85 in the master.

Each slave contains a coil 54 and a wafer 58 associated with the coil of that slave and the coils are pulsed from 55' in such sequence that all first positions of a null indicator are passed through before any second position is checked.

Incorporated in the bridge 85 is a polarized relay coil 86 and a dropping resistor 87 connected to a wafer 88 on the number selector switch and which wafer is controlled by coil 89 of the switch. Coil 89 also pulses the number lights on wafer 90 of the number selector switch.

Coil 91 of the letter Ledex selector switch controls the actuation of wafer 92 to provide for illumination of the letter lights designating the slaves; also a "go" signal indicating end of test cycle provided through wafer 92. Coil 91 also controls the actuation of wafer 97 having movable contact 98.

Contacts 93 on the number relay close when number relay coil 94 is energized and contacts 95 on the letter relay close when letter relay 96 is energized.

First considering the operation of the device when no faults are present in the monitored circuits: the pulsing and timing circuit 55' will pulse each of the 8 slaves a total of 18 positions or back to home position. On the 18th pulse the pulsing and timing circuit also pulses the coil of the letter selector switch 91, one position. Thus wiper 98 of wafer 97 is stepped one position. At the same time wiper 101 on wafer 92 will step one position thus illuminating light L–A. The polarized relay 86 is now connected through wafer 97 to wafer 58 of slave A through wiper 62. Since slave A had returned to home position 20 volts thus exist on one leg of the polarized relay coil 86. The other side of the coil is at 19 volts, thus providing for energizing the coil 86 and therefore the contacts close in such a manner as to energize relay coil 96 which closes contacts 95. Closure of contacts 95 energizes the coil 91 of the selector switch, which then steps one more position, thus stepping the wiper 98 on wafer 97 and the wiper 101 on wafer 92 one more position.

Since all slaves had returned to home position the above process will be repeated until the "go" light is illuminated.

Assuming a fault to exist in the A–5 position and the B–7 position the operation is as follows: the pulsing and timing circuit will pulse the slaves as already described. Upon reaching the 5th pulse from the pulsing and timing circuit the null detector coil 25 of slave A is energized, thus causing the locking coil 28 of slave A to become energized which in turn energizes the relay 52; this opens contacts 53 which are in series with coil 54 of slave A, thus preventing further pulsing of coil 54 of slave A. The pulsing and timing circuit 55' continues to pulse the remainder of the slave selector switch coils through the 5th and 6th positions to position 7, at which time slave B will react in the same manner as just described in connection with slave A.

The pulsing and timing circuit 55' will continue to pulse the remainder of the slaves back to their home positions since such slaves have no faults.

At the 18th pulse the selector switch coil 91 is again pulsed one position, stepping wiper 98 on wafer 97 and wiper 101 on wafer 92 one position, illuminating L–A. This places one leg of the coil 86 of the polarized relay in contact with the 5th position of slave A which is at 14 volts. A current then flows through coil 86 due to the 5-volt differential across the coil and the current flow is in such direction as to cause the contacts of the relay to close energizing relay 94; this closes contacts 93 energizing coil 89 and thereby stepping wiper 100 on wafer 88 and wiper lead on wafer 90 lighting L–1. Due to the potential difference across coil 86 the contact of wafer 88 will step until a balance of voltage occurs across coil 86 and the 5th position L–5 is illuminated and stays illuminated.

The advance start switch 103 must be depressed to start the second timing and pulsing circuit 105; this then automatically resets the search stop relay 52 and the null indicator of slave A.

When resetting is accomplished the pulsing and timing circuit 105 then pulses the selector coil 54 of slave A only until another fault is detected in slave A or until it reaches its home position.

As coil 54 is pulsed by the pulsing and timing circuit 105 the movable contact of wafer 58 steps and the movable contact 100 of wafer 88 since an unbalance of voltage exists across coil 86. At the same time the numeral lights are pulsed, flashing on and off with the pulses.

When slave A reaches the 18th position the polarized relay reverses direction causing relay 96 to be energized again closing contacts 95 and energizing coil 91; this steps wiper 98 on wafer 97 one position and steps the contact on wafer 92 lighting the L–B light.

Since the trouble has been assumed to be at B–7, slave B will operate to detect the fault as described in connection with slave A. When B–7 is indicated the apparatus stops.

Pressing the advance start switch 103 after noting the fault causes B unit to home one stop at a time. Since B unit has homed the polarized relay will be so energized as to energize relay 96 permitting contacts 95 to close energizing coil 91 stepping wafer 98 on wafer 97 one position and 101 on wafer 92 one position. Since no faults are present in slave C and the remaining slaves the action will be repeated until the "go" light is actuated. This terminates the test cycle.

Diode 109 is utilized to provide a positive voltage reset path for selector switch coil 54 to the home position in the slaves; diode 109' is utilized so that a negative voltage pulses coil 54 in the slaves. This arrangement minimizes the number of control wires.

As will be noted from FIGURE 4 each of the slaves are associated with an automatic reset 107 for the selector switches of the slave. The pulse from the automatic reset is opposite in polarity to that supplied by the circuits of 55' and 105 and passes through a rectifier 109 to the contacts of the wafer at 110 and then the coils as at 54 of slave A are reset for operation in a normal manner.

As will be noted from the drawing of FIGURE 4 an automatic reset 112 is also provided for the slave null detectors and a reset circuit at 114 is provided for the master Ledex switches.

As shown in FIGURE 4 a pre-settable timer 116 may be incorporated with an automatic starting circuit 118 to provide for automatic rather than manual operation. Also, a standard voltage check circuit is suitably provided at 120 for checking of the standard voltage supplies.

FIGURE 5 is a block diagram illustrating the cable connections between the various units. The control cable connections are similar and are designated by the numeral 123. Each of these cables comprises 3 control wires, a ground wire, and 2 wires for voltage standardization. The numeral 124 indicates the 115-volt A.C. input cables to the slaves. The numeral 125 indicates the cables between the slaves and the components indicated by the legends. The numeral 126 indicates the 115-volt A.C. line input.

The jacks for the connection of the cables 123 to the master are all designated by the numeral 127, while the jacks at the slaves are designated by the numeral 129. The jacks for the connection of the cables 124 to the master are all designated by the numeral 130, while the jacks at the slaves are designated by the numeral 132. The jacks for the connection of the slaves to the cables 125 are indicated at 131, while the jacks for the connection of the same cables to the components to be tested are designated at 133. The jacks for the connection of the master unit to cable 126 is indicated at 134. The plug for connection to the 115-volt A.C. power source is indicated by the numeral 136.

It will be understood that this invention is susceptible to modification in order to adapt it to different usages and conditions accordingly, it is desired to comprehend such modifications within this invention as may fall within the scope of the appended claims.

We claim:

1. In combination, in a device for detecting faults in a multiplicity of electrical components each having a plurality of electrical circuits to be tested and in which circuits a voltage deviation from a normal voltage may occur, a detection circuit for each component, each said detection circuit including fault sensing means and a meter relay, switching means associated with each meter relay for connecting the meter relay successively to a plurality of circuits to be tested, a source of a plurality of standard voltages which are wholly independent of the normal voltages and the said normal voltage deviations and which standard voltages have a fixed value, other switching means connecting said source with the meter relay and in opposition to voltages of the circuits, a master unit operably connected with the fault sensing means of each detection circuit, said master unit including a stepping switch cooperatively associated with the fault sensing means arranged to be inactivated upon the occurrence of a fault, and indicating means in the master unit operatively connected with the stepping switch of the master unit for indicating a fault, said indicating means comprising circuit and component indicating means, the component indicating means being electrically connected to the detection circuits of the components.

2. In a fault sensing device for electrical circuits having a multiplicity of electrical components each having a plurality of electrical circuits to be tested and wherein a voltage deviation from a normal voltage may occur, a multiplicity of slave units, one for each component to be tested, each said slave unit comprising a detection circuit and each slave having a stepping switch for stepping the slave successively from one electrical circuit having a meter relay to another, each said slave also having a source of standard voltages and stepping switch means for applying standard voltages to the meter relay of the detection circuit, said standard voltages being wholly independent of the normal voltages and the said normal voltage deviations and which standard voltages each have a fixed value, a master unit connected to each of the slaves, said master unit including a master stepping switch and means to pulse the master stepping switch, a coil of the master stepping switch in series with the pulse means, the master stepping switch being cooperatively connected to the detection circuit of each slave and arranged to be inactivated upon the occurrence of a fault, indicating means in the master unit for indicating a fault, said indicating means comprising slave indicating means which are directly connected to each slave and test circuit indicating means which are operatively associated with the stepping switch of the master unit.

3. In combination, in a device for detecting faults in a multiplicity of electrical components each having a plurality of electrical circuits to be tested wherein a voltage deviation from a normal voltage may occur, a slave unit which includes a meter relay operably connected to each component, a source of standard voltages which standard voltages are wholly independent of the normal voltages and the said normal voltage deviations and which standard voltages each have a fixed value, fault detection circuit means in each slave in electrical series with the meter relay of the slave, means to program the circuits of a component to be tested to its associated slave meter relay and fault detection circuit, a master unit operably connected with the fault detection circuit of each slave unit, said master unit including fault indicating means for each slave unit and also including fault indicating means for each circuit point to be tested, a polarized relay, pulsing and timing means in the master unit, said pulsing and timing means and said polarized relay and detection circuits being interconnected to sequentially energize the indicating means of the circuits and slaves, means responsive to the detection of a fault in one of the circuits to energize the polarized relay, and means responsive to the energization of the polarized relay to actuate the indicating means.

4. In combination, in a device for detecting faults in a multiplicity of electrical components each having a plurality of electrical circuits to be tested wherein a voltage deviation from a normal voltage may occur, a slave unit which includes a meter relay operably connected to each component, a source of standard voltages which standard voltages are wholly independent of the normal voltages and the said normal voltage deviations and which standard voltages each have a fixed value, fault detection circuit means in each slave in electrical series with the meter relay of the slave, means to program the circuits of a component to be tested to its associated slave meter relay and fault detection circuit, a master unit operably connected with the fault detection circuit of each slave unit, said master unit including fault indicating means for each slave unit and also including fault indicating means for each circuit point to be tested, a polarized relay, pulsing and timing means in the master unit, said pulsing and timing means and said polarized relay and detection circuits being interconnected to sequentially energize the indicating means of the circuits and slaves, means to advance the programming of the circuits of the components upon the occurrence of a fault in one circuit while inactivating the circuit having the fault, and means to energize the polarized relay with a voltage reflective of the fault location whereby the fault location is indicated.

5. In combination, in a fault indicating device for electric circuitry wherein a voltage deviation from a normal voltage may occur, a detection circuit comprising a meter relay including an operating coil, a source of a standard voltage which is wholly independent of the normal voltage and the said normal voltage deviation and which standard voltage has a fixed value, an indicating means operably connected to said meter relay and responsive to current of any direction in said coil; circuit means for conducting current in both directions and for directly electrically connecting the coil of said meter relay to a circuit point to be tested in opposition to the voltage of the standard source, said standard voltage source having a value of potential which is low relative to the normal voltage value of the circuit point, and means to bleed down the normal voltage value of the circuit point to substantially that of the standard voltage source.

6. In combination, in a fault indicating device for electrical circuitry wherein voltage deviations from normal voltages may occur: a null indicator element comprising a meter relay having an operating coil connected to a source of at least one standard voltage which is wholly independent of any of the normal voltages and the said normal voltage deviations and which standard voltages have fixed values, said standard voltage source being connected to provide voltage to said relay in opposition ot a voltage of a circuit to be tested; a movable member of said meter relay responsive to a voltage differential of any polarity across said coil and forming a portion of a circuit which is energizable upon the occurrence of said voltage differential of any polarity; a fault sensing relay in series with said movable member, stepping switch means including a coil operable for successively directly electrically connecting said coil of said meter relay between any of a series of test points and said source of standard voltage, indicating means connected to the device to indicate the points under test, and means to inactivate the stepping switch and the indicating means, said inactivating means comprising contacts of the fault sensing relay in series with the coil of the stepping switch, said standard voltage source having a value which is low relative to the normal voltage value of the test points, and means to bleed down the normal voltage value of the circuit point to substantially that of the standard voltage.

References Cited in the file of this patent

UNITED STATES PATENTS

| | | |
|---|---|---|
| 2,328,750 | Smith | Sept. 7, 1943 |
| 2,329,491 | Sulzer | Sept. 14, 1943 |
| 2,456,499 | Fritzinger | Dec. 14, 1948 |
| 2,468,398 | Griffin | Apr. 26, 1949 |
| 2,547,011 | Jacobsen | Apr. 3, 1951 |
| 2,603,689 | Stevens et al. | July 15, 1952 |
| 2,622,130 | Kabel | Dec. 16, 1952 |
| 2,642,558 | Terry | June 16, 1953 |
| 2,742,611 | Antos | Apr. 17, 1956 |
| 2,755,428 | Baum | July 17, 1956 |
| 2,756,409 | Lubkin | July 24, 1956 |
| 2,762,014 | Anderson | Sept. 4, 1956 |

FOREIGN PATENTS

| | | |
|---|---|---|
| 1,114,472 | France | Apr. 12, 1956 |